M. J. HOWARD.
METHOD OF ORNAMENTING SHEET GLASS.
APPLICATION FILED JUNE 30, 1920.
1,375,251. Patented Apr. 19, 1921.
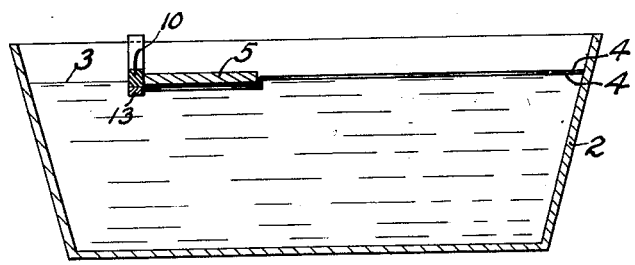
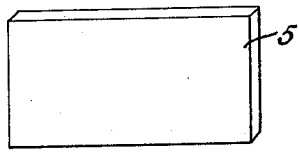
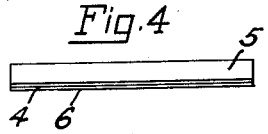
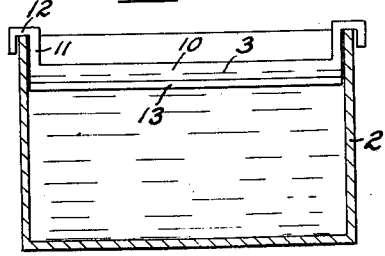
M. J. Howard  INVENTOR.
BY
Hiatt Sutherland ATTORNEY.

UNITED STATES PATENT OFFICE.

MICHAEL J. HOWARD, OF HARTFORD, CONNECTICUT.

METHOD OF ORNAMENTING SHEET-GLASS.

1,375,251. Specification of Letters Patent. Patented Apr. 19, 1921.

Application filed June 30, 1920. Serial No. 392,909.

*To all whom it may concern:*

Be it known that MICHAEL J. HOWARD, a citizen of the United States, residing at Hartford, in the county of Hartford and State of Connecticut, has invented certain new and useful Improvements in Methods of Ornamenting Sheet-Glass, of which the following is a specification.

This invention relates to a method of ornamenting sheet glass. It will be clear that in using the designation sheet glass I do so in a broad sense because the article may be of some equivalent substance such as celluloid. In like fashion the transparent or translucent article of whatever character it may be need not be in the form of a sheet, it might be a block for example, or it might be of cylindrical or tubular shape. By virtue of the invention I can in an inexpensive and ready manner secure artistic effects upon a transparent or translucent sheet or block or something of a similar nature. In carrying the method into effect I use a suitable receptacle in which some proper liquid is placed to the desired level, and ordinary water answers my purpose in a quite satisfactory manner. The receptacle will vary in conformity with the condition desired; that is to say its size or capacity may be varied. Initially I place on the surface of the liquid, suitable coloring matter for instance as by a brush which is struck by a pallet knife, or equivalent and which throws or scatters liquid paint on the level of the water. This paint may be any color or colors. I then throw in similar fashion onto the water colors such as gold paint, bronze paint, black paint, or any other suitable shade. A creamy body such as Batavia gum is then put on the surface of the liquid after the paints. This forms designs or veined effects on the surface of the water, this being brought about by the gum or creamy mass which causes the colors to assume vein forms and prepares it to color or ornament an object which as will be inferred is usually glass. The glass to be colored is if necessary dried on its surface and is then dipped into the water the proper depth to take on its submerged portion, the necessary colors from the surface of the water, and after being removed is dried artificially or naturally. Subsequently the coated surface is given its final coat by spraying or brushing, this brushing or spraying holds the ornamented coat to the surface in a permanent and substantial manner.

Referring to said drawings:

Figure 1 is a central longitudinal section of a receptacle or vat and its contents.

Fig. 2 is a cross section of said receptacle or vat.

Fig. 3 is a view of a glass block in initial condition.

Fig. 4 is an elevation of a finished glass block.

Fig. 5 is a top plan view of the same.

Like characters refer to like parts throughout the several views which are on different scales.

Into a suitable receptacle or vat as 2 I place a body of proper liquid say to the level 3. I obtain in practice excellent effects by the use of ordinary water. I then put a pigment upon the surface of the water by splashing in some convenient way such as by a brush which is struck with a pallet knife. This matter is usually liquid paint as 4. I then dash on the liquid body colored pigments such as gold, bronze, black or yellow; in fact any shade. I then flow onto the water a suitable gum 4' thinned for instance to the consistency of cream and Batavia gum answers my requirements in this respect. The Batavia gum or its equivalent of proper consistency causes the colors on the water to assume vein effects. This prepares the liquid body in condition to color the object which should or is to be treated. The sheet or block of glass or other transparent or translucent substance is then if required dried at least on one surface and the adjacent edges of the object are also if necessary dried. The object as 5 is then dipped into the water a short distance where it takes onto its dipped surface the colors. It is dried and then coated in some convenient way as at 6, the coating generally being ordinary paint of the proper color which includes either white or black and such paint may be applied by spraying or brushing.

Across the receptacle or vat 2 is situated a member as 10 which generally consists of a strip of wood of a length to extend from one side of the tank or receptacle to the other and which has rising from its ends the arms 11 furnished with projections 12 to fit over the upper side edges of the tank or receptacle. The dividing member 10 is preferably weighted along its lower edge in some convenient way as by lead 13 so as to hold the dividing member 10 below the surface of the water in the tank or receptacle 2. At the commencement of the process the dividing member 10, will be disposed against an end of the tank or receptacle. When the colors are dipped from the level of the water or other liquid, the surface from which the colors are thus taken becomes clear. In this event the member 10 is moved along the tank or receptacle to separate the clear water from the remainder, and as a consequence prevent the scattering of the colors.

What I claim is:

1. A method comprising placing colors on the surface of a liquid, dipping an object into the liquid to cause the colors to be applied to the surface of the object and also to be removed from the liquid, removing the object from the liquid, then applying a coating to the colored surface of the object, and then separating the surface of the liquid which has had the colors removed, from the remainder of the surface.

2. A method comprising placing colors on the surface of a liquid, dipping an object into the liquid to cause the colors to be applied to the surface of the object, and removing the object from the liquid with the colors applied thereto and then separating the surface of the liquid which has had the colors removed from the remainder of the surface.

In testimony whereof I affix my signature in the presence of two witnesses.

MICHAEL J. HOWARD.

Witnesses:
JOHN BUCKLEY,
HEATH SUTHERLAND.